United States Patent
Czyz et al.

(10) Patent No.: US 8,827,034 B2
(45) Date of Patent: Sep. 9, 2014

(54) PRESSURE PULSATION DAMPENING DEVICE

(71) Applicant: Visteon Global Technologies, Inc., Van Buren Township, MI (US)

(72) Inventors: Petr Czyz, Hodslavice (CZ); Kastriot Shaska, Northville, MI (US)

(73) Assignee: Halla Visteon Climate Control Corporation, Daejeon-si (KR)

( * ) Notice: Subject to any disclaimer, the term of this patent is extended or adjusted under 35 U.S.C. 154(b) by 0 days.

(21) Appl. No.: 13/744,830

(22) Filed: Jan. 18, 2013

(65) Prior Publication Data

US 2014/0202201 A1  Jul. 24, 2014

(51) Int. Cl.
*F16K 47/02* (2006.01)

(52) U.S. Cl.
USPC ............................................. 181/233; 181/212

(58) Field of Classification Search
CPC ............................... F16L 55/033; B62D 5/062
USPC ......................................................... 181/233
See application file for complete search history.

(56) References Cited

U.S. PATENT DOCUMENTS

| | | | |
|---|---|---|---|
| 2,261,948 A | 11/1941 | Beach | |
| 2,840,180 A | 6/1958 | Nobles et al. | |
| 3,580,357 A | 5/1971 | Whitney | |
| 5,387,016 A | 2/1995 | Joseph et al. | |
| 5,475,976 A | 12/1995 | Phillips | |
| 5,539,164 A * | 7/1996 | van Ruiten | 181/233 |
| 5,728,981 A * | 3/1998 | van Ruiten | 181/233 |
| 6,123,108 A | 9/2000 | Chen et al. | |
| 6,279,613 B1 | 8/2001 | Chen et al. | |
| 6,688,423 B1 | 2/2004 | Beatty et al. | |
| 6,848,476 B2 | 2/2005 | Davis | |
| 6,935,848 B2 | 8/2005 | Marshal et al. | |
| 7,017,610 B2 | 3/2006 | Zimpfer et al. | |
| 7,325,570 B1 | 2/2008 | Krieger | |
| 7,775,560 B2 | 8/2010 | Zanardi et al. | |
| 8,496,087 B2 * | 7/2013 | McKenzie et al. | 181/233 |
| 2011/0048846 A1 * | 3/2011 | Bonneau et al. | 181/211 |

FOREIGN PATENT DOCUMENTS

| | | |
|---|---|---|
| DE | 202009014112 U1 | 1/2010 |
| EP | 1864838 A1 | 12/2007 |
| FR | 2860854 A1 | 4/2005 |
| FR | 2901738 A1 | 12/2007 |

* cited by examiner

*Primary Examiner* — Forrest M Phillips
(74) *Attorney, Agent, or Firm* — Fraser Clemens Martin & Miller LLC; J. Douglas Miller

(57) ABSTRACT

A dampening device of the present invention is configured to attenuate acoustic energy produced by a fluid circulating through a fluid system. The dampening device includes a hollow tubular body having a first end, a second end, and a collar interposed between the first end and the second end. The tubular body is disposed within at least one conduit of the fluid system, forming a space between an inner surface of the conduit and the first end of the tubular body and another space between the inner surface of the conduit and the second end of the tubular body.

19 Claims, 4 Drawing Sheets

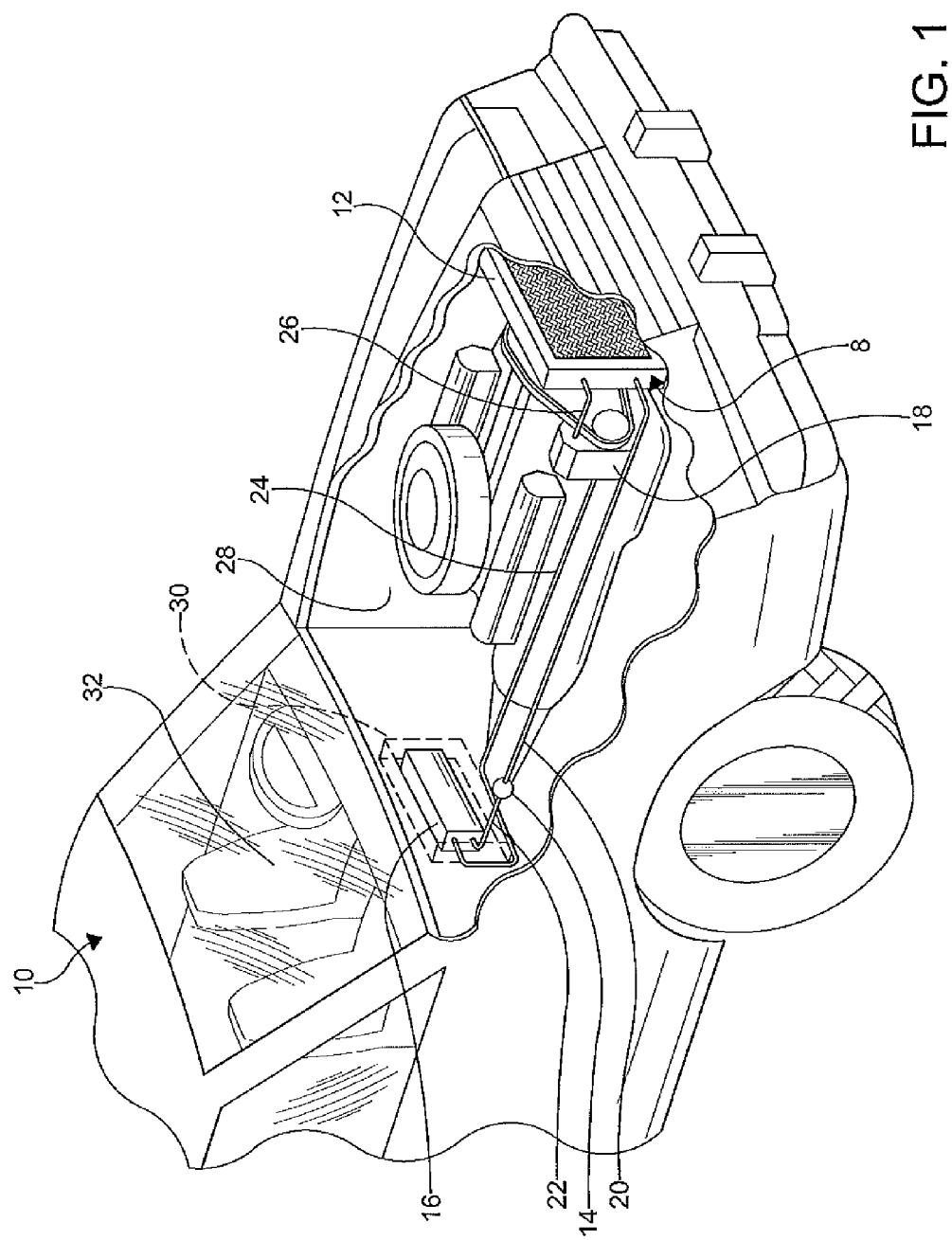

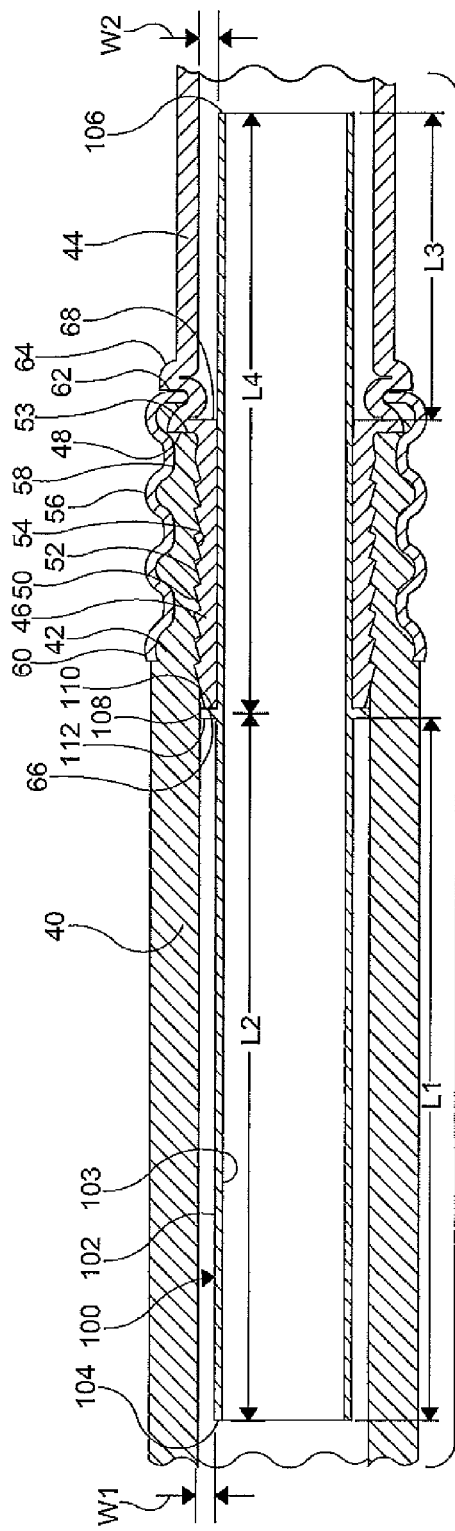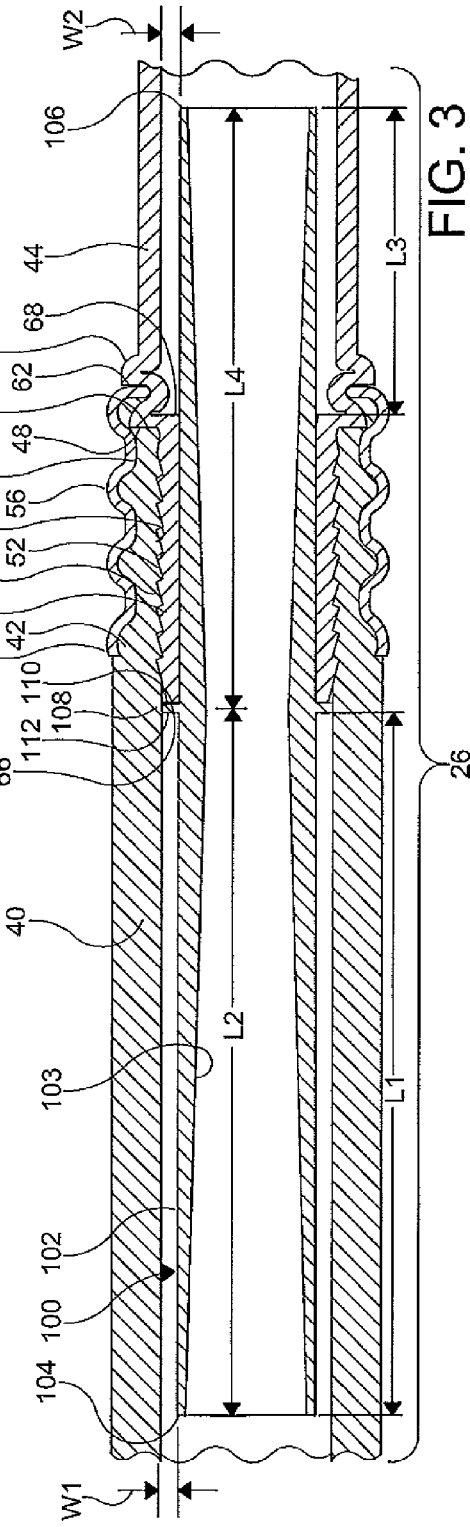

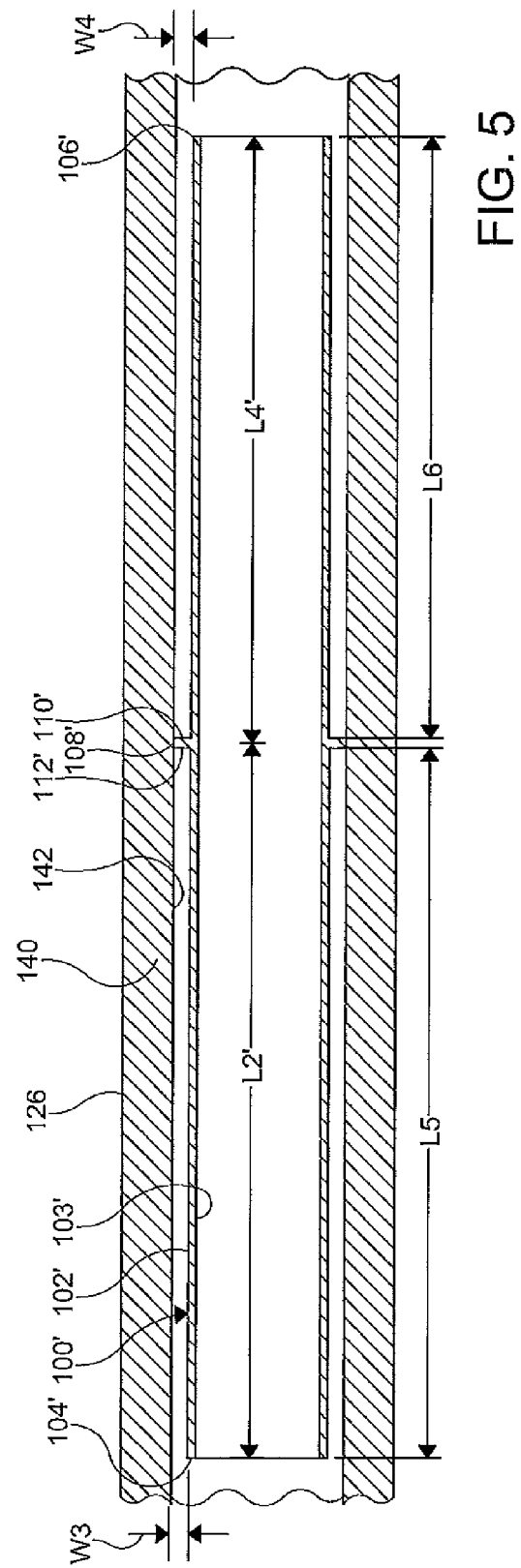

PRESSURE PULSATION DAMPENING DEVICE

FIELD OF THE INVENTION

The present invention relates generally to a pressure pulsation dampening device and, more particularly, to a pressure pulsation dampening device for an air-conditioning circuit.

BACKGROUND OF THE INVENTION

A compressor is one of several components in an air conditioning system. The compressor compresses a refrigerant circulating in the air conditioning system, raising a pressure and a temperature of thereof. Typically, the compressor is used in combination with a condenser, an expansion valve, and an evaporator to heat or cool a desired space. Depending on a direction of flow of the refrigerant through the air conditioning system, the air conditioning system can be used to remove heat from the desired space or provide heat to the desired space.

Noise and vibration within the air conditioning system may be caused by pressure pulsation waves in the compressed refrigerant. The pressure pulsation waves in the refrigerant typically generate discrete narrowband tones at the harmonics of an operating speed of the compressor. The pressure pulsation waves in the compressed refrigerant usually originate at a discharge port of the compressor and propagate downstream, inducing additional noise and vibration upon contact with other components of the air conditioning system. The noise and vibration are particularly undesirable when the air conditioning system is located within a motor vehicle.

Various dampening devices have been designed to attenuate the pressure pulsation waves in the air conditioning system. For piston-driven compressors, the dampening devices typically include an expansion chamber positioned inside a housing of the compressor on a discharge side of a cylinder head. While such dampening devices can prevent pressure pulsation waves from propagating downstream, a placement of the expansion chamber adjacent the cylinder head decreases an operating efficiency of the compressor and increases an overall size of the compressor.

There are other known dampening devices for attenuating pressure pulsation waves in systems which convey a fluid under pressure (e.g. a power steering system of the motor vehicle). One such dampening device transfers a flow of the fluid under pressure from one perforated conduit to another perforated conduit as a means of attenuating the pressure pulsation waves. In particular, the dampening device includes a housing having a chamber formed therein, an inlet conduit provided with a plurality of apertures that allows the fluid from the system to flow into the chamber, and an outlet conduit provided with a plurality of apertures that allows the fluid to flow from the chamber into the outlet conduit and be returned to the system. Although the dampening device attenuates pressure pulsation waves generated by a fluid pump, the dampening device increases an overall size and complexity of the system.

Accordingly, it would be desirable to produce a dampening device which attenuates pressure pulsation waves generated by a compressor of an air conditioning system, while minimizing an effect on an operating efficiency of the compressor and a structural complexity and a package size of the air conditioning system.

SUMMARY OF THE INVENTION

In concordance and agreement with the present disclosure, a dampening device which attenuates pressure pulsation waves generated by a compressor of an air conditioning system, while minimizing an effect on an operating efficiency of the compressor and a structural complexity and a package size of the air conditioning system, has surprisingly been discovered.

In one embodiment, a fluid system, comprises: a conduit formed by at least one hose member; and a dampening device disposed within the conduit, the dampening device including a hollow tubular body having a first end, a second end, and a collar interposed between the first end and the second end, wherein a space is formed between an inner surface of the conduit and the first end of the tubular body, and another space is formed between the inner surface of the conduit and the second end of the tubular body, and wherein the space formed between the inner surface of the conduit and the first end of the tubular body facilitates an attenuation of pressure pulsation waves having a first desired frequency and the space formed between the inner surface of the conduit and the second end of the tubular body facilitates an attenuation of pressure pulsation waves having a second desired frequency.

In another embodiment, a fluid system, comprises: a conduit formed by a first hose member and a second hose member; and a dampening device disposed within the conduit, the dampening device including a hollow tubular body having a first end and a second end, wherein at least a portion of the first end of the dampening device is disposed in the first hose member and at least a portion of the second end is disposed in the second hose member.

In yet a further embodiment, an air conditioning system for a vehicle, comprises: a compressor configured to compress a fluid; a condenser in fluid communication with the compressor, wherein the condenser is configured to cause the fluid to condense; an evaporator in fluid communication with at least one of the compressor and the condenser, wherein the evaporator is configured to cause the fluid to change phase, and wherein the compressor, the condenser, and the evaporator are fluidly connected by at least one conduit; and a dampening device disposed within the at least one conduit, the dampening device including a hollow tubular body having a first end and a second end, wherein a space is formed between an inner surface of the at least one conduit and the first end of the tubular body, and another space is formed between the inner surface of the at least one conduit and the second end of the tubular body, and wherein the space formed between the inner surface of the at least one conduit and the first end of the tubular body facilitates an attenuation of pressure pulsation waves having a first desired frequency and the space formed between the inner surface of the at least one conduit and the second end of the tubular body facilitates an attenuation of pressure pulsation waves having a second desired frequency.

BRIEF DESCRIPTION OF THE DRAWINGS

The above, as well as other objects and advantages of the invention, will become readily apparent to those skilled in the art from a reading the following detailed description of the invention when considered in the light of the accompanying drawings in which:

FIG. 1 is a fragmentary perspective view of a vehicle with a portion thereof cutaway including an air conditioning system as is commonly know in the art;

FIG. 2 is a fragmentary cross-sectional elevational view of a dampening device according to an embodiment of the present invention disposed in a conduit of an air conditioning system, wherein the dampening device has a substantially uniform cross-sectional flow area;

FIG. 3 is a fragmentary cross-sectional elevational view of a dampening device according to another embodiment of the present invention disposed in a conduit of an air conditioning system, wherein the dampening device has a varying cross-sectional flow area;

FIG. 5 is a fragmentary cross-sectional elevational view of the dampening device illustrated in FIG. 2 disposed in an alternate embodiment of a conduit of an air conditioning system.

DETAILED DESCRIPTION OF THE INVENTION

Figure 4:
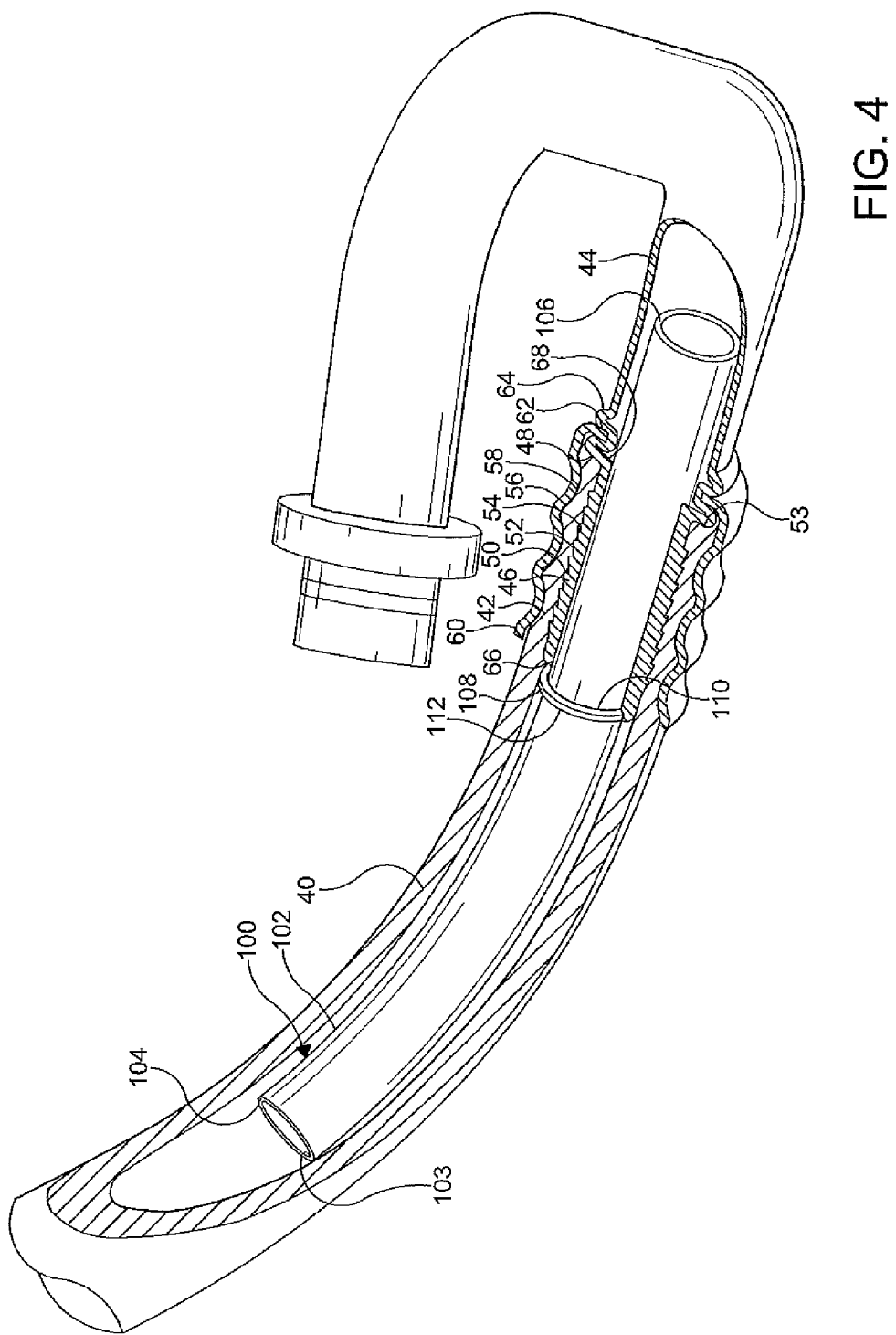
FIG. 4 is a fragmentary perspective view of a dampening device according to another embodiment of the present invention disposed in a conduit of an air conditioning system, showing a portion of a first hose member of the conduit and a portion of a second hose member of the conduit cutaway.

The following detailed description and appended drawings describe and illustrate various exemplary embodiments of the invention. The description and drawings serve to enable one skilled in the art to make and use the invention, and are not intended to limit the scope of the invention in any manner.

While the various features of this invention are hereinafter illustrated and described as providing a sound or energy dampening device for an automotive air conditioning system, it is understood that various features of the invention can be utilized in other applications or systems that convey a fluid, especially a fluid under pressure, such as a power steering system of a vehicle, for example.

FIG. 1 shows a simplified air conditioning system 8 of a vehicle 10 as is commonly known in the art. The air conditioning system 8 includes a condenser 12, an expansion device 14, an evaporator 16, and a compressor 18, fluidly connected by associated conduits 20, 22, 24, 26 configured to convey a flow of high and low pressure refrigerant (not shown). It is understood that the air conditioning system 8 may include additional components, sensors, etc. (not shown) as necessary for operation. As illustrated, the condenser 12 is disposed in an engine compartment 28, or more precisely, in front of a radiator (not shown) of the vehicle 10 and the evaporator 16 is disposed in a heating, air conditioning, and ventilating module 30 configured to condition air supplied to a passenger compartment 32 of the vehicle 10. Within the condenser 12, a high pressure vapor refrigerant is condensed to a high pressure, low temperature liquid refrigerant as the condenser 12 transfers heat absorbed from the passenger compartment 32 and from a compression process to ambient air outside of the passenger compartment 32. Exiting the condenser 12, the high pressure liquid refrigerant passes through the expansion device 14, causing the high pressure liquid refrigerant to expand into a low pressure liquid refrigerant. The low pressure liquid refrigerant then flows from the expansion device 14 into the evaporator 16. As the low pressure liquid refrigerant passes through the evaporator 16, the low pressure liquid refrigerant boils by absorbing heat from the passenger compartment 32. The low pressure vapor refrigerant exiting from the evaporator 16 is received into a suction side of the compressor 18. Within the compressor 18, the low pressure vapor refrigerant is compressed into a high temperature vapor refrigerant. The compressed high temperature vapor refrigerant is then caused to flow from a discharge side of the compressor 18 to the condenser 12.

During operation of the air conditioning system 8, the compressor 18 generates pressure pulsation waves that are transmitted by the refrigerant flowing through the conduits 20, 22, 24, 26. In order to minimize noise generated by the compressor 18, such as from resonance and vibration, for example, a dampening device 100 of the present invention, shown in FIG. 2, is disposed in at least one of the conduits 20, 22, 24, 26. In certain embodiments, the dampening device 100 is disposed in the conduit 26 between the compressor 18 and the condenser 12 (i.e. a pressure line), or in the conduit 24 between the evaporator 16 and the compressor 18 (i.e. a return line). In other embodiments, the dampening device 100 is disposed in both the conduits 24, 26. For simplicity, only the air conditioning system 8 having the dampening device 100 disposed in the conduit 26 is described hereinafter. It is understood, however, that the structure of the dampening device 100 disposed in the conduit 26 is substantially similar to the structure of the dampening device disposed in the other conduits 20, 22, 24.

As shown in FIGS. 2-4, the conduit 26 is formed by a first hose member 40 having a first end (not shown) and a second end 42 coupled to a second hose member 44 having a first end 46 and a second end (not shown). More particularly, the second end 42 of the first hose member 40 is coupled to the first end 46 of the second hose member 44. In certain embodiments, the first end of the first hose member 40 is fluidly connected to the compressor 18 and the second end of the second hose member 44 is fluidly connected to the condenser 12. Those skilled in the art will appreciate that the conduit 26 may be formed from a single hose member, as shown in FIG. 5 and described in detail hereinafter, or include additional hose members than shown. Various materials or combinations thereof can be used to form the hose members 40, 44. For example, the first hose member 40 can be formed from a substantially flexible polymeric material such as a fabric-reinforced rubber tubing or the like, and the second hose member 44 can be formed from a substantially rigid metal material such as a steel tubing or the like.

As illustrated, the first end 46 of the second hose member 44 includes a shoulder 48 and a plurality of spaced apart, radially outwardly extending angled barbs 50 provided on an outer surface 52 thereof. The barbed first end 46 of the second hose member 44 is disposed in the second end 42 of the first hose member 40 such that a surface 53 of the second end 42 abuts the shoulder 48 of the second hose member 44. The barbs 50 are configured to engage an inner surface 54 of the second end 42 of the first hose member 40 to provide a positive resistance for militating against disengagement of the first hose member 40 therefrom. A generally cylindrical sleeve 56 surrounds the outer surface 52 of the first end 46 of the second hose member 44 as well as an outer surface 58 of the second end 42 of the first hose member 40. The sleeve 56 includes an open end 60 and a terminating end 62. The terminating end 62 is disposed between the shoulder 48 and a roll-formed annular bead 64 of the second hose member 44, forming a bead lock to militate against an axial displacement of the sleeve 56. As shown, the sleeve 56 is crimped over the second end 42 of the first hose member 40, sandwiching the second end 42 between the sleeve 56 and the barbed first end 46 of the second hose member 44 to form a substantially fluid-tight connection and further militate against disengagement of the first hose member 40 from the second hose member 44. It is understood that the inner surface 54 and/or the outer surface 58 of the second end 42 of the first hose member 40 may include at least one surface irregularity (e.g. knurling) to further enhance the substantially fluid-tight connection between the first hose member 40 and the second hose member 44, so as to further militate against disengagement therebetween. It is also understood that the first hose member 40 may be coupled to the second hose member 44 by other means as desired such as by clamping, welding, brazing, soldering, adhesive, fasteners, and the like, for example.

The dampening device 100 of the present invention, shown in FIGS. 2-4, is a unitary, generally elongated hollow tubular body 102 having a through bore 103 extending in a direction that is coaxial with respect to a longitudinal central axis of the dampening device 100. The body 102 shown has a first end 104, a second end 106, and a radially outwardly extending annular collar 108 interposed therebetween. It is understood, however, that the body 102 of the dampening device 100 may be formed from separate sections if desired. The first end 104 of the body 102 is disposed in the second end 42 of the first hose member 40 such that a surface 110 of the collar 108 abuts a surface 66 of the first end 46 of the second hose member 44 to militate against an axial displacement of the dampening device 100. An outer diameter of the first end 104 of the body 102 is smaller than an inner diameter of the second end 42 of the first hose member 40, forming a first annular space therebetween. The first annular space terminates at a surface 112 of the collar 108. As shown, the surface 112 is generally planar and has a pitch in respect of the longitudinal central axis of the dampening device 100 of about 90 degrees. It is understood, however, that the surface 112 can have any shape and contour suitable to reflect the pressure pulsation waves of the refrigerant. A length L1 of the first annular space is determined based upon a desired frequency F1 (e.g. 250 Hz), and multiples thereof (e.g. 500 Hz, 750 Hz, etc.), to be attenuated by the dampening device 100. In certain embodiments, the length L1 of the first annular space is adjusted by increasing or decreasing a length L2 of the first end 104 of the body 102. A radial width W1 of the first annular space is determined based upon a desired efficiency and performance in minimizing noise, vibration, and harshness (NVH) at the desired frequency F1.

The second end 106 of the body 102 is disposed in the first end 46 of the second hose member 44. In certain embodiments, an outer diameter of the second end 106 of the body 102 is larger than an inner diameter of the first end 46 of the second hose member 44 adjacent the sleeve 56. Accordingly, the second end 106 of the body 102 is press-fit into the first end 46 of the second hose member 44, which provides structural rigidity and strength to the connection between the first hose member 40 and the second hose member 44, and thereby minimizes a risk of leakage. Elsewhere, the outer diameter of the second end 106 of the body 102 is smaller than the inner diameter of the first end 46 of the second hose member 44 to form a second annular space therebetween. The second annular space terminates at a surface 68 of the first end 46 of the second hose member 44. As shown, the surface 68 is generally planar and has a pitch in respect of the longitudinal central axis of the dampening device 100 of about 90 degrees. It is understood, however, that the surface 68 can have any shape and contour suitable to reflect the pressure pulsation waves of the refrigerant. A length L3 of the second annular space is determined based upon a desired frequency F2 (e.g. 375 Hz), and multiples thereof (e.g. 750 Hz, 1125 Hz, etc.), to be attenuated by the dampening device 100. In certain embodiments, the length L3 of the second annular space is adjusted by increasing or decreasing either a length L4 of the second end 106 of the body 102 or a length of the crimp connection generally extending from the surface 66 to the surface 68 of the second hose member 44. A radial width W2 of the second annular space is determined based upon a desired efficiency and performance in minimizing NVH at the desired frequency F2.

As illustrated in FIG. 2, a cross-sectional flow area of each of the first end 104 of the body 102 and the second end 106 thereof may be substantially uniform. In certain other embodiments, however, at least one of the first end 104 and the second end 106 of the body 102 has a varying cross-sectional flow area. For example, the cross-sectional flow area of the first end 104 of the body 102, shown in FIG. 3, gradually decreases from an end opening of the body 102 to a point adjacent the collar 108 and the cross-sectional flow area of the second end 106 of the body 102, shown in FIG. 3, gradually increases from the point adjacent the collar 108 to an opposing end opening of the body 102.

When the first end 104 of the body 102 has a varying cross-sectional flow area, the length L2 of the first end 104 of the body 102 is determined based upon a desired frequency F3 (e.g. 300 Hz), and multiples thereof (e.g. 600 Hz, 900 Hz, etc.), to be attenuated by the dampening device 100. The cross-sectional flow area of the first end 104 of the body 102 is determined based upon a desired efficiency and performance in minimizing NVH at the desired frequency F3. A rate of change of the cross-sectional flow area of the first end 104 of the body 102 can be any suitable rate of change to reach the desired efficiency and performance in minimizing NVH at the desired frequency F3 such as a 1% rate of change, for example.

Similarly, when the second end 106 of the body 102 has a varying cross-sectional flow area, the length L4 of the second end 106 of the body 102 is determined based upon a desired frequency F4 (e.g. 425 Hz), and multiples thereof (e.g. 850 Hz, 1275 Hz, etc.), to be attenuated by the dampening device 100. The cross-sectional flow area of the second end 106 of the body 102 is determined based upon a desired efficiency and performance in minimizing NVH at the desired frequency F4. A rate of change of the cross-sectional flow area of the second end 106 of the body 102 can be any suitable rate of change to reach the desired efficiency and performance in minimizing NVH at the desired frequency F4 such as a 1% rate of change, for example.

Additionally, when the cross-sectional flow area of at least one of the first end 104 and the second end 106 of the body 102 varies, a ratio of the length L2 of the first end 104 of the body 102 to the length L4 of the second end 106 of the body 102 is determined based upon a desired frequency F5 (e.g. 500 Hz), and multiples thereof (e.g. 1000 Hz, 2000 Hz, etc.), to be attenuated by the dampening device 100.

In certain embodiments, the dampening device 100 is configured to attenuate acoustic energy having frequencies in a range of about 200 Hz to about 2000 Hz which is produced from the pressure pulsation waves of the refrigerant. More specifically, the dampening device 100 is configured to attenuate acoustic energy having frequencies in a range of about 250 Hz to about 500 Hz and multiples thereof. It is understood that each of the lengths L1, L2, L3, L4 and the ratio of the length L2 to the length L4 can be adjusted such that the frequencies F1, F2, F3, F4, F5 (and multiples thereof), are different, the same, or any combination thereof. Accordingly, the dampening device 100 can be employed in a variety of vehicle platforms or systems. For example, the dampening device 100 can be configured to be employed in various vehicles having different engine types (e.g. diesel, gas, ethanol, etc.), compressor types (e.g. wobble plate, swash plate, scroll, etc.), and number of cylinders (e.g. 4-cylinder, 6-cylinder, 8-cylinder, etc.).

Each of the first end 104 and the second end 106 of the body 102 of the dampening device 100 can be formed from any suitable material such as a metal material or a non-metal material, for example. In certain embodiments, the entire dampening device 100 is formed from a substantially rigid material. However, as shown in FIG. 4, at least the first end 104 of the body 102 of the dampening device 100 may be formed from a substantially flexible material to allow the dampening device 100 to be received in conduits having various shapes, size, and contours.

FIG. 5 shows the dampening device illustrated in FIG. 2 disposed in an alternate embodiment of the conduit 26 shown in FIGS. 2-4. Structure similar to that illustrated in FIGS. 2-4 includes the same reference numeral and a prime (') symbol for clarity. In FIG. 5, a conduit 126 is formed by a hose member 140. Various materials or combinations thereof can be used to form the hose member 140. For example, the hose member 140 can be formed from a substantially flexible polymeric material such as a fabric-reinforced rubber tubing, a substantially rigid metal material such as a steel tubing, or the like. As shown, the hose member 140 has a generally smooth inner surface 142.

The dampening device 100' is a unitary, generally elongated hollow tubular body 102' having a through bore 103' extending in a direction that is coaxial with respect to a longitudinal central axis of the dampening device 100'. The body 102' shown has a first end 104', a second end 106', and a radially outwardly extending annular collar 108' interposed therebetween. It is understood, however, that the body 102' of the dampening device 100' may be formed from separate sections if desired. The dampening device 100' is disposed in the hose member 140 such that an outer peripheral surface of the collar 108' abuts the inner surface 142 of the hose member 140, forming an interference connection to militate against an axial displacement of the dampening device 100' within the conduit 26'. It is understood, however, that the inner surface 142 of the hose member 140 may include at least one surface irregularity (e.g. knurling) to further militate against an axial movement of the dampening device 100' within the conduit 26'.

An outer diameter of the first end 104' of the body 102' is smaller than an inner diameter of the hose member 140, forming a first annular space therebetween. The first annular space terminates at a surface 112' of the collar 108'. As shown, the surface 112' is generally planar and has a pitch in respect of the longitudinal central axis of the dampening device 100' of about 90 degrees. It is understood, however, that the surface 112' can have any shape and contour suitable to reflect the pressure pulsation waves of the refrigerant. A length L5 of the first annular space is determined based upon a desired frequency F6 (e.g. 250 Hz), and multiples thereof (e.g. 500 Hz, 750 Hz, etc.), to be attenuated by the dampening device 100'. In certain embodiments, the length L5 of the first annular space is adjusted by increasing or decreasing a length L2' of the first end 104' of the body 102'. A radial width W3 of the first annular space is determined based upon a desired efficiency and performance in minimizing noise, vibration, and harshness (NVH) at the desired frequency F6.

An outer diameter of the second end 106' of the body 102' is smaller than the inner diameter of the hose member 140, forming a second annular space therebetween. The second annular space terminates at a surface 110' of the collar 108'. As shown, the surface 110' is generally planar and has a pitch in respect of the longitudinal central axis of the dampening device 100' of about 90 degrees. It is understood, however, that the surface 110' can have any shape and contour suitable to reflect the pressure pulsation waves of the refrigerant. A length L6 of the second annular space is determined based upon a desired frequency F7 (e.g. 375 Hz), and multiples thereof (e.g. 750 Hz, 1125 Hz, etc.), to be attenuated by the dampening device 100'. In certain embodiments, the length L7 of the second annular space is adjusted by increasing or decreasing a length L4' of the second end 106' of the body 102'. A radial width W4 of the second annular space is determined based upon a desired efficiency and performance in minimizing noise, vibration, and harshness (NVH) at the desired frequency F7.

As illustrated in FIG. 5, a cross-sectional flow area of each of the first end 104' of the body 102' and the second end 106' thereof may be substantially uniform. In certain other embodiments, however, at least one of the first end 104' and the second end 106' of the body 102' has a varying cross-sectional flow area. For example, the cross-sectional flow area of the dampening device 100' may vary similar to the cross-sectional flow area of the dampening device 100, shown in FIG. 3.

When the first end 104' of the body 102' has a varying cross-sectional flow area, the length L2' of the first end 104' of the body 102' is determined based upon a desired frequency F8 (e.g. 300 Hz), and multiples thereof (e.g. 600 Hz, 900 Hz, etc.), to be attenuated by the dampening device 100'. The cross-sectional flow area of the first end 104' of the body 102' is determined based upon a desired efficiency and performance in minimizing NVH at the desired frequency F8. A rate of change of the cross-sectional flow area of the first end 104' of the body 102' can be any suitable rate of change to reach the desired efficiency and performance in minimizing NVH at the desired frequency F8 such as a 1% rate of change, for example.

Similarly, when the second end 106' of the body 102' has a varying cross-sectional flow area, the length L4' of the second end 106' of the body 102' is determined based upon a desired frequency F9 (e.g. 425 Hz), and multiples thereof (e.g. 850 Hz, 1275 Hz, etc.), to be attenuated by the dampening device 100'. The cross-sectional flow area of the second end 106' of the body 102' is determined based upon a desired efficiency and performance in minimizing NVH at the desired frequency F9. A rate of change of the cross-sectional flow area of the second end 106' of the body 102' can be any suitable rate of change to reach the desired efficiency and performance in minimizing NVH at the desired frequency F9 such as a 1% rate of change, for example.

Additionally, when the cross-sectional flow area of at least one of the first end 104' and the second end 106' of the body 102' varies, a ratio of the length L2' of the first end 104' of the body 102' to the length L4' of the second end 106' of the body 102' is determined based upon a desired frequency F10 (e.g. 500 Hz), and multiples thereof (e.g. 1000 Hz, 2000 Hz, etc.), to be attenuated by the dampening device 100'.

In certain embodiments, the dampening device 100' is configured to attenuate acoustic energy having frequencies in a range of about 200 Hz to about 2000 Hz which is produced from the pressure pulsation waves of the refrigerant. More specifically, the dampening device 100' is configured to attenuate acoustic energy having frequencies in a range of about 250 Hz to about 500 Hz and multiples thereof. It is understood that each of the lengths L2', L4', L5, L6 and the ratio of the length L2' to the length L4' can be adjusted such that the frequencies F6, F7, F8, F9, F10 (and multiples thereof), are different, the same, or any combination thereof. Accordingly, the dampening device 100' can be employed in a variety of vehicle platforms or systems. For example, the dampening device 100' can be configured to be employed in various vehicles having different engine types (e.g. diesel, gas, ethanol, etc.), compressor types (e.g. wobble plate, swash plate, scroll, etc.), and number of cylinders (e.g. 4-cylinder, 6-cylinder, 8-cylinder, etc.).

Each of the first end 104' and the second end 106' of the body 102' of the dampening device 100' can be formed from any suitable material such as a metal material or a non-metal material, for example. In certain embodiments, the entire dampening device 100' is formed from a substantially rigid material. However, at least the first end 104' of the body 102' of the dampening device 100' may be formed from a substantially flexible material to allow the dampening device 100' to be received in conduits having various shapes, size, and contours.

The dampening device 100 disposed in the conduit 26 and the dampening device 100' disposed in the conduit 26' operate in a like manner. For simplicity, only the operation of the dampening device 100 disposed in the conduit 26 will be described in detail hereinafter.

In operation, the refrigerant flows through the first hose member 40 in such a manner that the first end 104 of the body 102 of the dampening device 100 opposes the arriving flow. As pressure pulsation waves enter the first annular space formed between the first end 104 of the body 102 and the first hose member 40, the pressure pulsation waves are reflected by the surface 112 of the collar 108. The reflection by the collar 108 dampens the pressure pulsation waves within the first annular space, and the reflected dampened waves interfere with subsequent pressure pulsation waves entering the first annular space formed between the first end 104 of the body 102 and the first hose member 40 further dampening the pressure pulsation waves. Accordingly, a transmission of pressure pulsations in the refrigerant flowing through the bore 103 of the body 102 of the dampening device 100 and into the second hose member 44 is minimized.

Further, as pressure pulsation waves enter the second annular space formed between the second end 106 of the body 102 of the dampening device 100 and the second hose member 44, the pressure pulsation waves are reflected by the surface 68 of the second hose member 44. The reflection by the surface 68 dampens the pressure pulsation waves within the second annular space, and the reflected dampened waves interfere with subsequent pressure pulsation waves entering the second annular space formed between the second end 106 of the body 102 and the second hose member 40 further dampening the pressure pulsation waves. Accordingly, the transmission of pressure pulsations in the refrigerant flowing through the second hose member 44 is minimized.

Additionally, when the cross-sectional area of the dampening device 100 varies from the first end 104 of the body 102 to the second end 106 of the body 102, the pressure pulsation waves are further dampened within the body 102. Accordingly, the transmission of pressure pulsations in the refrigerant flowing through the bore 103 of the body 102 of the dampening device 100 and into the second hose member 44 is further minimized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fluid system, comprising:
   a conduit formed by at least one hose member; and
   a dampening device entirely disposed within the conduit, the dampening device including a hollow tubular body having a first end, a second end, and a collar interposed between the first end and the second end and dividing an open space between the conduit and the dampening device into a first space formed between an inner surface of the conduit and the first end of the tubular body and a second space formed between the inner surface of the conduit and the second end of the tubular body, and wherein the first space facilitates an attenuation of pressure pulsation waves having a first desired frequency and the second space facilitates an attenuation of pressure pulsation waves having a second desired frequency.

2. The fluid system of claim 1, wherein the collar of the tubular body abuts a portion of the inner surface of the conduit to militate against an axial displacement of the tubular body within the conduit.

3. The fluid system of claim 1, wherein a length of the space formed between the inner surface of the conduit and the first end of the tubular body is determined based upon the first desired frequency to be attenuated by the dampening device.

4. The fluid system of claim 1, wherein a length of the space formed between the inner surface of the conduit and the second end of the tubular body is determined based upon the second desired frequency to be attenuated by the dampening device.

5. The fluid system of claim 1, wherein a length of the first end of the tubular body is determined based upon a third desired frequency of pressure pulsation waves to be attenuated by the dampening device.

6. The fluid system of claim 5, wherein a length of the second end of the tubular body is determined based upon a fourth desired frequency of pressure pulsation waves to be attenuated by the dampening device.

7. The fluid system of claim 6, wherein a ratio of a length of the first end of the tubular body to a length of the second end of the tubular body is determined based upon a fifth desired frequency of pressure pulsation waves to be attenuated by the dampening device.

8. The fluid system of claim 1, wherein at least one of the first end of the tubular body and the second end of the tubular body has a varying cross-sectional flow area.

9. The fluid system of claim 1, wherein the conduit is formed by a first hose member and a second hose member.

10. The fluid system of claim 9, wherein at least a portion of the first end of the tubular body is disposed in the first hose member and at least a portion of the second end of the tubular body is disposed in the second hose member.

11. The fluid system of claim 9, wherein the first hose member is fluidly connected to a compressor of an air conditioning system and the second hose member is fluidly connected to a condenser of the air conditioning system.

12. A fluid system, comprising:
    a conduit formed by a first hose member and a second hose member; and
    a dampening device entirely disposed within the conduit, the dampening device including a hollow tubular body having a first end, a second end, and a partition member dividing an open space between an inner surface of the conduit and the dampening device into two separate spaces and formed on the tubular body between the first and second ends to support the hollow tubular body inside the conduit, wherein at least a portion of the first end of the dampening device is disposed in the first hose member and at least a portion of the second end is disposed in the second hose member.

13. The fluid system of claim 12, wherein the first hose member is fluidly connected to a compressor of the fluid system and the second hose member is fluidly connected to a condenser of the fluid system.

14. The fluid system of claim 12, wherein a space is formed between an inner surface of the conduit and the first end of the tubular body and another space is formed between the inner surface of the conduit and the second end of the tubular body.

15. The fluid system of claim 14, wherein a length of the space formed between the inner surface of the conduit and the first end of the tubular body is determined based upon a first desired frequency of pressure pulsation waves to be attenuated by the dampening device.

16. The fluid system of claim 15, wherein a length of the space formed between the inner surface of the conduit and the second end of the tubular body is determined based upon a second desired frequency of pressure pulsation waves to be attenuated by the dampening device.

17. The fluid system of claim 16, wherein a length of the first end of the tubular body is determined based upon a third desired frequency of pressure pulsation waves to be attenuated by the dampening device.

18. The fluid system of claim 17, wherein a length of the second end of the tubular body is determined based upon a fourth desired frequency of pressure pulsation waves to be attenuated by the dampening device.

19. The fluid system of claim 18, wherein a ratio of a length of the first end of the tubular body to a length of the second end of the tubular body is determined based upon a fifth desired frequency of pressure pulsation waves to be attenuated by the dampening device.

* * * * *